UNITED STATES PATENT OFFICE.

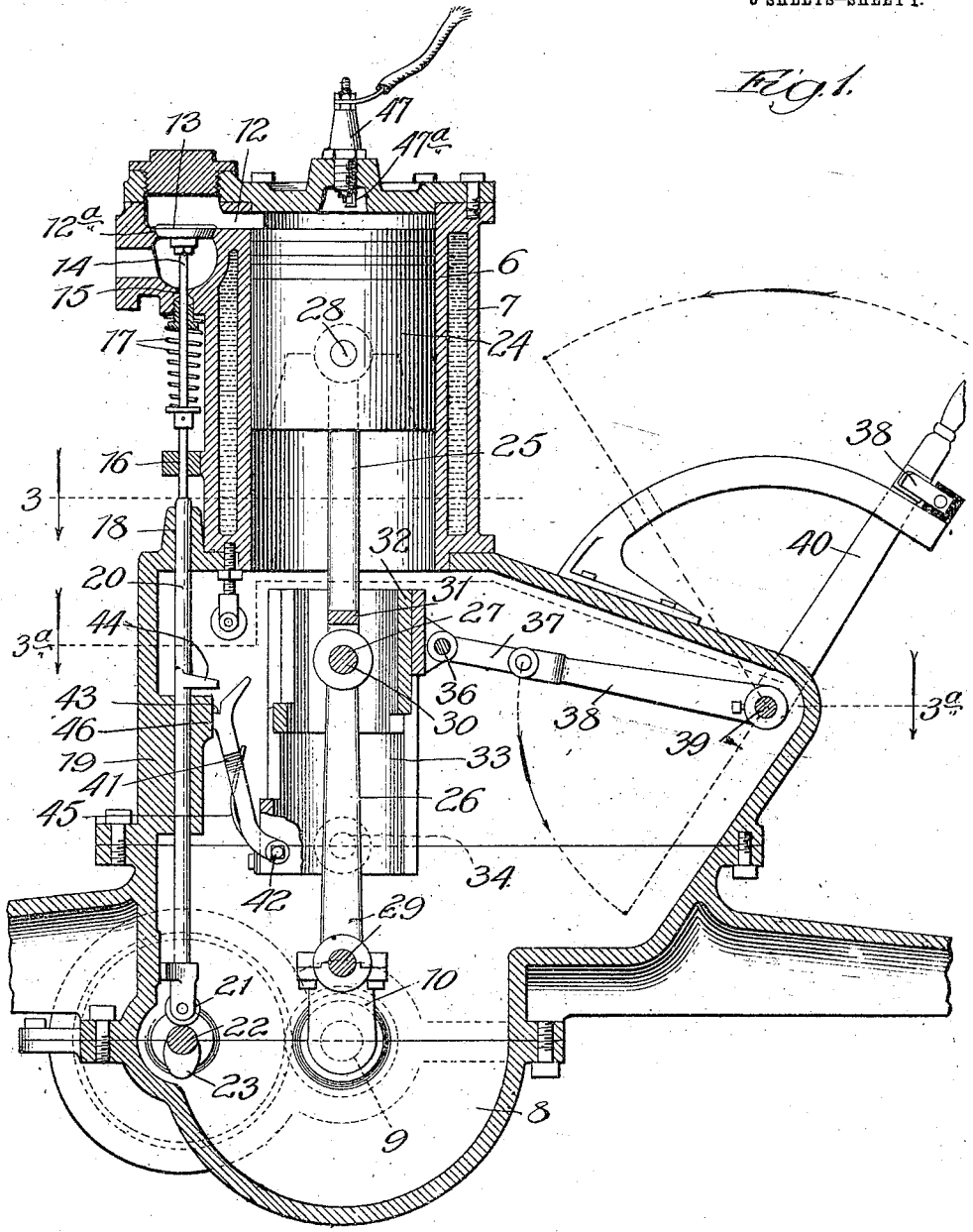

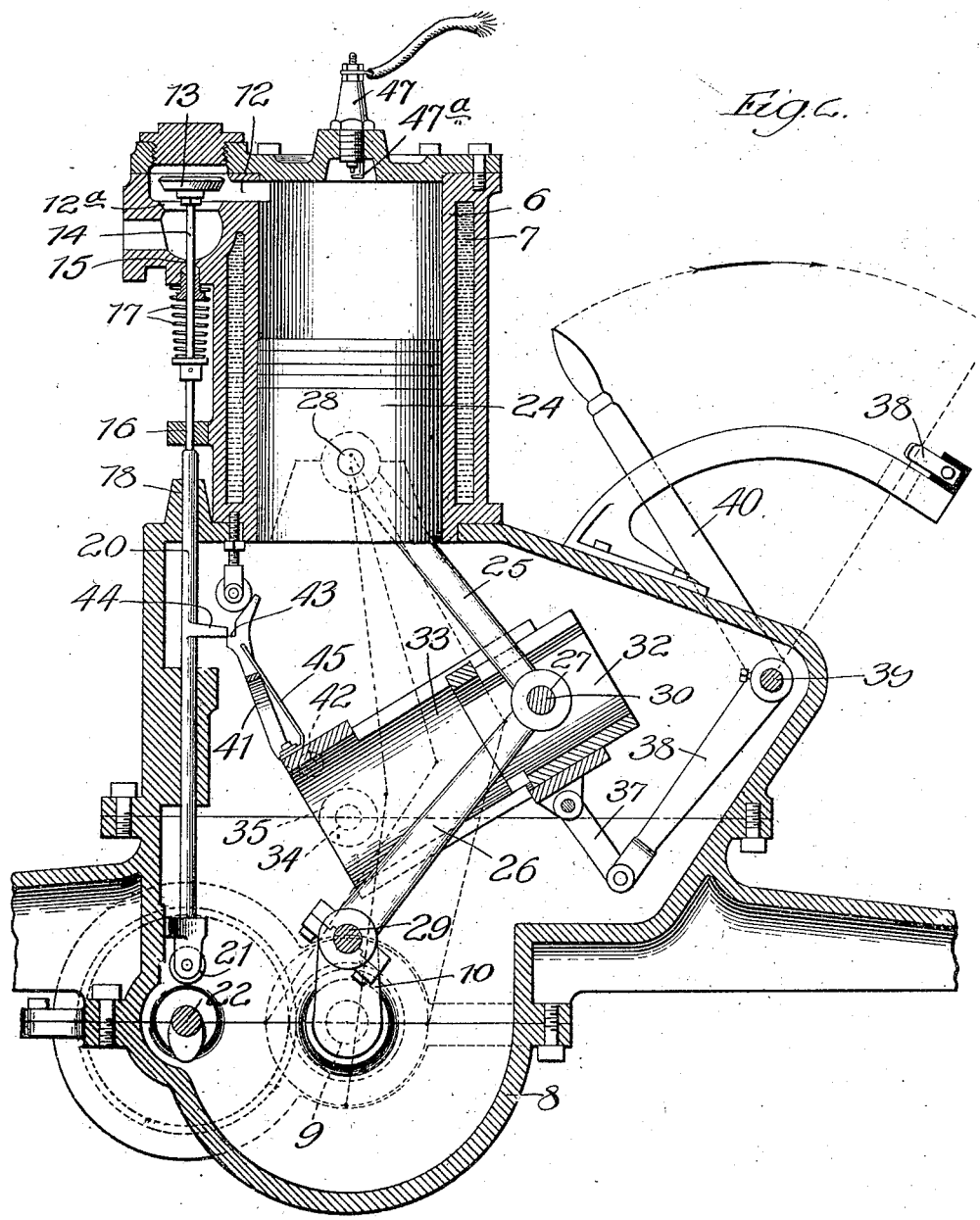

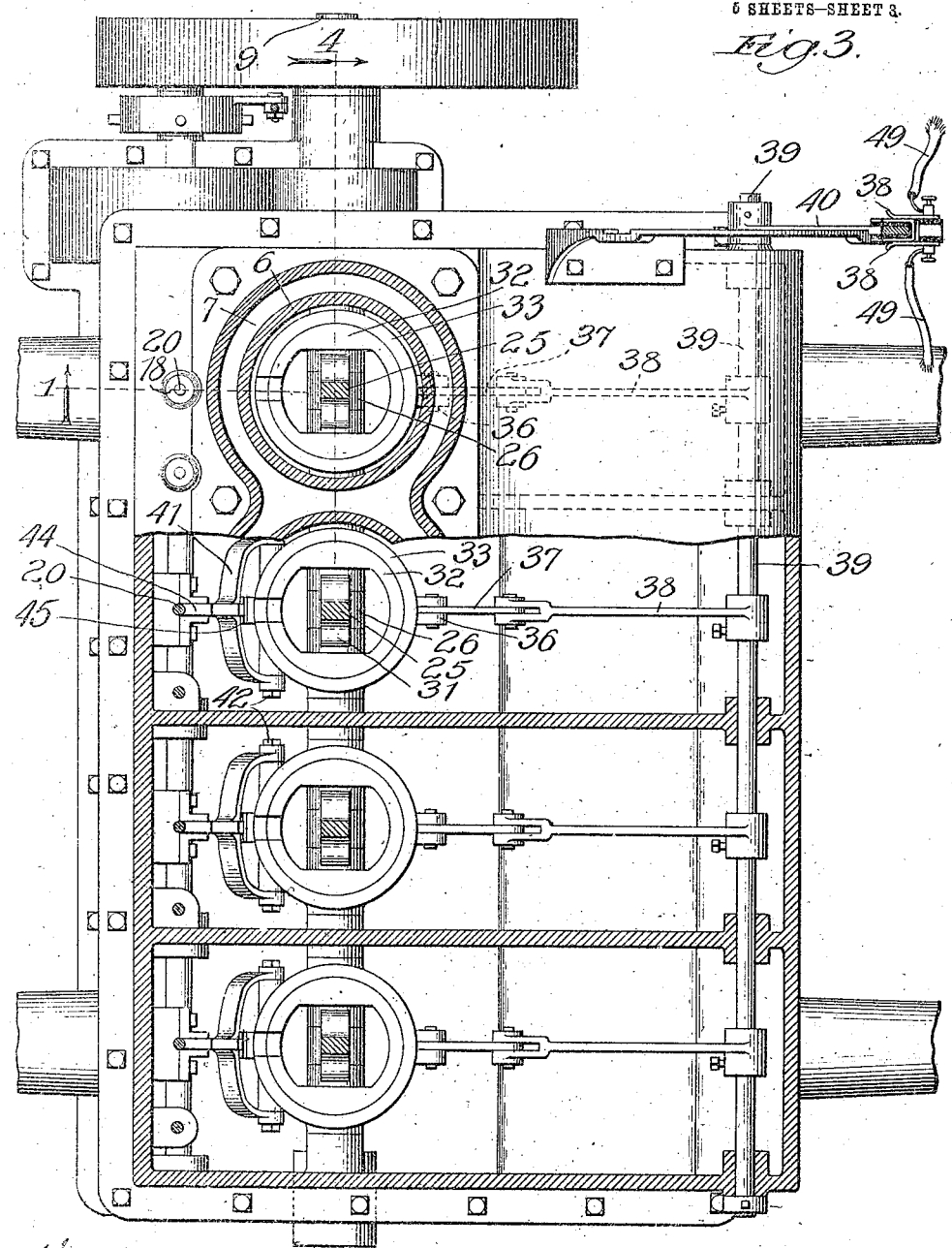

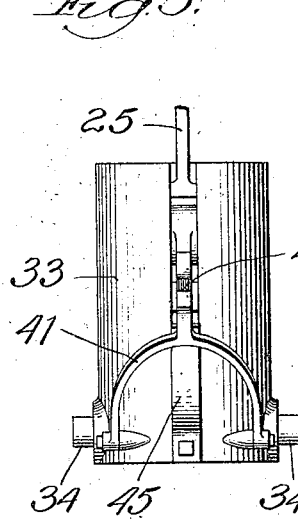
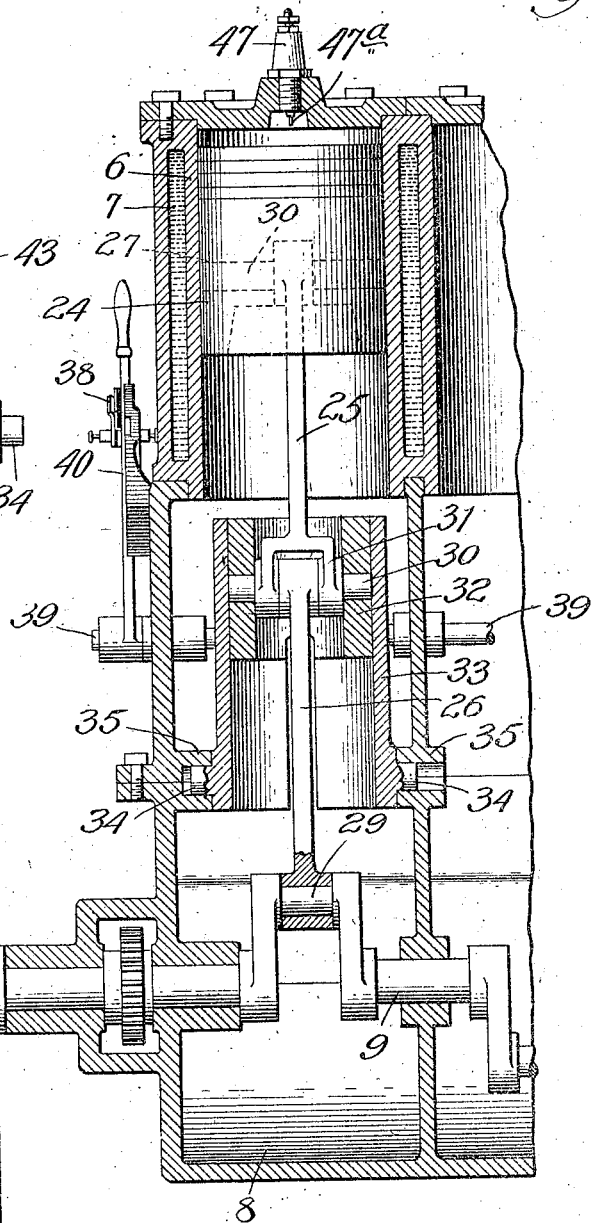

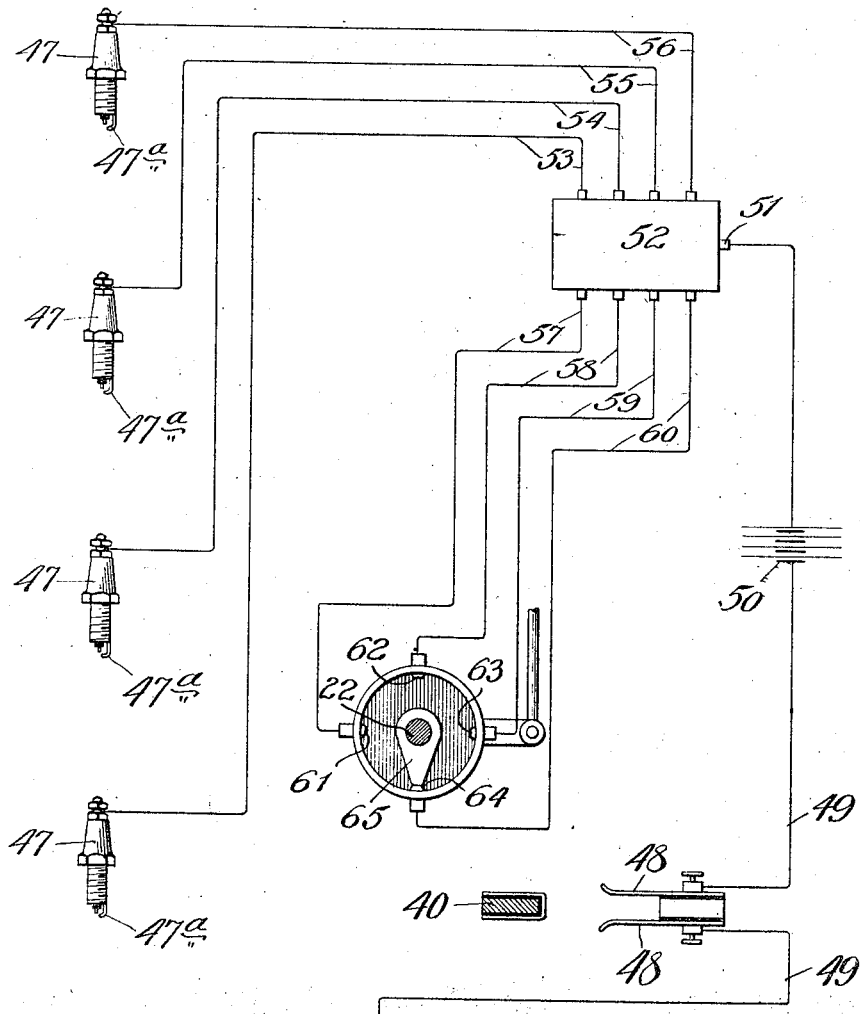

EMIL M. KRAMER, OF PAXTON, ILLINOIS.

INTERNAL-COMBUSTION ENGINE.

1,134,685. Specification of Letters Patent. Patented Apr. 6, 1915.

Application filed November 25, 1913. Serial No. 802,856.

*To all whom it may concern:*

Be it known that I, EMIL M. KRAMER, a citizen of the United States, residing at Paxton, in the county of Ford and State of Illinois, have invented a new and useful Improvement in Internal-Combustion Engines, of which the following is a specification.

My primary object is to provide a novel and simple construction of internal combustion engine which may be started without moving the crank-shaft of the engine, thus avoiding the necessity of manually cranking the engine.

Referring to the accompanying drawings: Figure 1 is a view in vertical sectional elevation of an engine constructed in accordance with my invention, the engine being shown in normal condition. Fig. 2 is a similar view of the engine showing it in one position it assumes during the operation of initially compressing therein the charge used for starting the engine. Fig. 3 is an irregular section taken at the lines 3 and 3ª on Fig. 1 and viewed in the direction of the arrows. Fig. 4 is a broken sectional view taken at the line 4 on Fig. 3 and viewed in the direction of the arrow. Fig. 5 is a view in elevation of one of the similar pivotally supported guide-sleeves for the jointed pitman of the engine; and Fig. 6 is a diagrammatic view of the electric ignition system for the engine controlled by the manually operating means for the engine.

The engine in connection with which I have chosen to illustrate my invention is of the four cylinder four cycle type employing cam-operated gas-inlet valves, though I do not wish to be understood as intending to limit it thereto.

Each of the cylinders of the engine, represented at 6 (one only of which is shown) and water-jacketed, as indicated at 7, surmounts a crank-case 8 through which the crank-shaft 9 carrying the cranks 10 extends and is journaled, the fly-wheel of the shaft 9 being represented at 11.

Each cylinder 6 contains in its wall a gas-passage 12 adapted to be connected with a supply of gas, as for example a carbureter in accordance with common practice; the inlet valves for conducting the admission of the fuel into the cylinders for compression and ignition therein being represented at 13 and interposed in the passages 12, it being understood that there is one valve 13 for each cylinder 6. As above stated, the valves 13 are mechanically operated, the stem 14 of each valve 13 sliding in bearings 15 and 16 on the engine-casing, springs 17 encircling the stems 14 serving to normally hold them to their seats 12ª for closing the passages 12. Slidingly confined on the engine casing in bearings 18 and 19 therein, and arranged in line with the respective stems 14, are rods 20 which carry rollers 21 which are yieldingly held against the periphery of a cam-shaft 22 and in the path of movement of the cams 23 thereon, corresponding in number to the valves 13, the cam-shaft 22 being driven in any suitable manner in proper timed relation to the pistons hereinafter described for causing the inlet-valves 13 of the respective cylinders to be opened during the intake strokes of the pistons in accordance with common practice.

Each cylinder 6 contains a piston 24 which is connected with one of the cranks 10 through the medium of a jointed pitman formed of sections 25 and 26 pivotally connected together and with the piston and respective crank 13, as indicated at 27, 28 and 29, respectively. The pivot-joints 27 are each formed of a pin 30 passing through the lower bifurcated end 31 of the pitman-section 25 and the upper end of the pitman-section 26, the pin 30 being connected at its ends in a hollow cross-head 32 which slides in a cylindrical sleeve 33 trunnioned, as indicated at 34, in bosses 35 on the interior of the crank case. The sleeve 32, one for each piston, are pivotally connected at their upper ends, as indicated at 36, with links 37 pivoted at their opposite ends to bell-crank levers 38 secured on a shaft 39 journaled in the engine-casing and provided with an operating handle 40 which later, when moved in the direction of the arrow in Fig. 1, causes all of the sleeves 33 to be swung to the right in said figure to the position represented in Fig. 2 for a purpose hereinafter explained.

Each sleeve 33 carries a trip-finger 41 pivoted thereto at its lower bifurcated end, as represented at 42. The fingers 41, which have shouldered upper ends 43 for engaging with lugs 44 on the rods 20, are passed outwardly by springs 45, against lugs 46 on the interior of the engine-casing and against which lugs the fingers 41 slide when the sleeves 33 are rocked as hereinbefore described.

In the normal operating condition of the engine, the sleeves 33 are maintained in the position illustrated of the one in Fig. 1; viz. in line with the respective pistons, the sleeves 33 operating merely as guides for the cross-heads 32, and the engine operates in the same manner as ordinary internal combustion engines, the charges drawn into the cylinders past the valves 13, timed in their operation as hereinbefore described, being fired in the cylinders by ignition plugs 47, and the spent charges exhausted through valves (not shown) in accordance with common practice.

Assuming the engine to be at rest, it is started in the following manner: The operator swings the operating handle 40 to the left in Fig. 1, thereby turning the shaft 39 and swinging the bell-cranks 38 downwardly, which causes all of the sleeves 33 to rock on their trunnions 34 to the right in said figure to the position represented in Fig. 2. Thus operating the sleeves 33 causes the one of the pistons 24 which, when the engine is at rest, is in the uppermost position, to be moved downwardly a distance equal, or substantially equal, to that which it is moved in the normal operation of the engine. At the same time the trip-fingers 41 are lifted, and by engaging with the lugs 44 on the rods 20 force the inlet-valves 13 open, and thus as the last-referred to piston moves downwardly, a charge of fuel is sucked into the cylinder. The operator then swings the handle 40 back to the position represented in Fig. 1 which returns all of the sleeves 33 and pistons 24 to normal position (Fig. 1), thus compressing the charge which was sucked into the cylinder as just described. The charge thus compressed is fired by the ignition device 47 in the cylinder and the engine starts under its own power. As the distance traveled by the pistons 24 in the manual operation described depends upon the distance between the pivots 27 and 29, it will be understood that the piston which is connected with the one of the cranks 10, which occupies the highest position, will be given the greatest movement when the handle 40 is operated as described, and that the distances the other pistons will be moved will be correspondingly reduced, if moved at all, depending on the positions their coöperating cranks 10 occupy, the lower the crank 10 the less movement its coöperating piston 24 will have, when the handle 40 is operated as described. Thus when the handle 40 is swung to the left in Fig. 1, the greatest throw will be imparted to the piston 24 which occupies the highest position when the engine is at rest, whereby the effective charge is produced in the cylinder the piston in which is on the firing stroke.

In order to prevent accidental ignition in the cylinders during the operation of the handle 40, I provide for the automatic breaking of the ignition circuit by the act of swinging the lever out of the position represented in Fig. 1, the illustrated arrangement for this purpose being as follows: Supported in spaced relation are two spring clips 48 insulated from each other and adapted to be electrically connected together by the handle 40 when in the position shown in Fig. 1. The clips 48 are shown interposed in the ground-wire 49 from the battery 50, the latter connecting with a binding post 51 on the spark coil 52 from which four wires 53, 54, 55 and 56 lead to the several ignition plugs 47, the terminals 47$^a$ of which in practice are grounded on the engine cylinders, and four wires 57, 58, 59 and 60 lead to the four contacts 61, 62, 63 and 64 of the rotary timer 65, the ignition system and its various connections being commonly used and therefore not requiring more detailed illustration or description. It will be understood, however, that the controlling of the circuit by the lever 40 may be effected at any other point, or in any other suitable manner.

The feature of providing a piston with a jointed connecting rod is also disclosed in my pending application for United States Letters Patent Serial No. 695,364, filed May 6, 1912.

While I have illustrated and described my improvements as applied to the working cylinder and piston, wherein the charges are ignited, I do not wish to be understood as limiting it thereto as certain features thereof, as is manifest, may be applied to piston and cylinder mechanism, auxiliary to the working piston and cylinder, as will be understood from my above referred to co-pending application.

Furthermore while I have illustrated and described my invention as applied to a four cylinder four cycle engine of a particular construction, I do not wish to be understood as intending to limit it to such particular construction, or to a four cycle engine of the number of cylinders stated, or even to a four cycle engine.

Furthermore, it is my desire to cover the invention as fully and completely as the prior state of the art will permit.

What I claim as new and desire to secure by Letters Patent is:

1. In an internal-combustion engine, the combination of cylinder and piston members, said cylinder-member being adapted to be connected with a fuel-supply, a rotatably mounted crank-shaft, means connecting said piston with the crank on said shaft for rotating the latter, means for moving one of said members longitudinally of the other thereof without moving said crank-shaft and thereby drawing into the cylinder-member and compressing therein a charge, and means for igniting the compressed charge in said cylinder-member.

2. In an internal-combustion engine, the combination of cylinder and piston members, said cylinder being adapted to be connected with a fuel-supply, a rotatably mounted crank-shaft, means connecting said piston with the crank on said shaft for rotating the latter, means for moving said piston longitudinally of said cylinder without moving said crank-shaft and thereby drawing into the cylinder and compressing therein a charge, and means for igniting the compressed charge in said cylinder.

3. In an internal-combustion engine, the combination of a crank-shaft, a cylinder adapted to be connected with a fuel-supply, a piston in said cylinder, a crank-shaft, a jointed connector connecting the crank on said shaft with said piston, means for flexing said connector at its joint to actuate said piston without moving said crank-shaft and thereby drawing into the cylinder and compressing therein a charge, and means for igniting the compressed charge in said cylinder.

4. In an internal-combustion engine, the combination of a crank-shaft, a cylinder adapted to be connected with a fuel-supply, a piston in said cylinder, a crank-shaft, a jointed connector connecting the crank on said shaft with said piston, a shiftable guide with which said connector engages and operating when shifted to move said piston in said cylinder, means for shifting said guide, and means for igniting the compressed charge in said cylinder.

5. In an internal-combustion engine, the combination of a crank-shaft, a cylinder adapted to be connected with a fuel-supply, a piston in said cylinder, a crank-shaft, a jointed connector connecting the crank on said shaft with said piston, a shiftable guide with which said connector engages at said joint, means for shifting said guide, and means for igniting the compressed charge in said cylinder.

6. In an internal-combustion engine, the combination of a crank-shaft, a cylinder adapted to be connected with a fuel-supply, a piston in said cylinder, a crank-shaft, a jointed connector connecting the crank on said shaft with said piston, a pivotally-supported guide with which said connector engages and operating when rocked in opposite directions to reciprocate said piston in said cylinder and thereby drawing into the cylinder and compressing therein a charge, means for rocking said guide on its pivots, and means for igniting the compressed charge in said cylinder.

7. In an internal combustion engine, the combination of a crank-shaft, a cylinder adapted to be connected with a fuel-supply, a piston in said cylinder, a crank-shaft, a jointed connector connecting the crank on said shaft with said piston, a pivotally-supported guide with which said connector engages it at its joint, means for rocking said guide in opposite directions for reciprocating said piston and thereby drawing into the cylinder and compressing therein a charge, and means for igniting the compressed charge in said cylinder.

8. In an internal-combustion engine, the combination of a rotatably mounted crank-shaft, cylinder and piston members, said cylinder being adapted to be connected with a fuel supply, a mechanically-operated valve controlling communication between said fuel supply and said cylinder, means connecting said piston with the crank on said shaft for rotating the latter, means for opening said valve, means for moving one of said members longitudinally of the other thereof without moving said crank-shaft and thereby drawing into the cylinder-member and compressing therein a charge, and means for igniting the charge compressed in said cylinder.

9. In an internal-combustion engine, the combination of a rotatably mounted crank-shaft, cylinder and piston members, said cylinder being adapted to be connected with a fuel-supply, a mechanically-operated valve controlling communication between said fuel-supply and said cylinder, means connecting said piston with the crank on said shaft for rotating the latter, means for moving one of said members longitudinally of the other thereof, without moving said crank-shaft, and opening said valve and thereby drawing into the cylinder-member and compressing therein a charge, and means for igniting the charge compressed in said cylinder.

10. In an internal-combustion engine, the combination of a rotatably mounted crank-shaft, cylinder and piston members, said cylinder being adapted to be connected with a fuel-supply, a mechanically-operated valve controlling communication between said fuel-supply and said cylinder, means connecting said piston with the crank on said shaft for rotating the latter, means for moving said piston longitudinally of said cylinder and opening said valve and thereby drawing into the cylinder and compressing therein a charge, and means for igniting the charge compressed in said cylinder.

11. In an internal-combustion engine, the combination with a rotatably mounted crank-shaft having a plurality of cranks, pairs of cylinder and piston members, said cylinders being adapted to be connected with a fuel-supply, means connecting said pistons with the cranks on said shaft for rotating the latter, means for moving one of the members of the pair thereof the piston of which is uppermost when the engine is at rest, longitudinally of the other member of said pair without moving said crank-shaft and thereby drawing into the cylinder and compressing therein a charge, and means for igniting the compressed charge in said cylinder.

12. In an internal-combustion engine, the combination of a rotatably mounted crank-shaft having a plurality of cranks, cylinders adapted to be connected with a fuel-supply, pistons in said cylinders, means connecting said pistons with the cranks on said shafts for rotating the latter, means for moving the one of said pistons which is uppermost when the engine is at rest, longitudinally of the cylinder in which it is confined, without moving said crank-shaft and thereby drawing into the cylinder and compressing therein a charge, and means for igniting the compressed charge in said cylinder.

13. In an internal-combustion engine, the combination of a crank-shaft having a plurality of cranks, a plurality of cylinders adapted to be connected with a fuel-supply, pistons therein, jointed connectors connecting said pistons with the cranks on said shaft, pivotally-supported guide-members with which said connectors slidingly engage, valves controlling communication between said supply and cylinders, mechanically-operated means for operating said valves in the normal operation of said engine, means for operating said valves independently of said mechanically-operated means, means for rocking said guides, and means for igniting the compressed charge in said cylinder.

14. In an internal-combustion engine, the combination of a crank-shaft having a plurality of cranks, a plurality of cylinders adapted to be connected with a fuel-supply, pistons therein, jointed connectors connecting said pistons with the cranks on said shaft, pivotally-supported guide-members with which said connectors slidingly engage, valves controlling communication between said supply and cylinders, mechanically-operated means for operating said valves in the normal operation of the engine, means for rocking said guides and operating said valves independently of said mechanically-operated means, and means for igniting the compressed charge in said cylinder.

15. In an internal combustion engine, the combination of cylinder and piston members, said cylinder being adapted to be connected with a fuel-supply, a rotatably mounted crank-shaft, means connecting said piston with the crank on said shaft for rotating the latter, means for moving one of said members longitudinally of the other thereof without moving said crank-shaft and thereby drawing into the cylinder-member and compressing therein a charge, an electrical circuit including means for igniting the compressed charge in said cylinder, and means controlled by said second-named means for breaking said circuit during the operation of said last-named means.

16. In an internal combustion engine, the combination of a crank-shaft, a cylinder, a piston in said cylinder, a rod connecting the crank on said shaft with said piston and having a flexible joint, and means for flexing said rod at its joint to actuate said piston without moving said crank-shaft.

17. In an internal combustion engine, the combination of a crank-shaft, a cylinder, a piston in said cylinder, a rod connecting the crank on said shaft with said piston and having a flexible joint, a shiftable guide with which said rod engages and operating when shifted to move said piston in said cylinder, and means for shifting said guide.

18. In an internal combustion engine, the combination of a crank-shaft, a cylinder, a piston in said cylinder, a rod connecting the crank on said shaft with said piston and having a flexible joint, a shiftable guide with which said rod engages at said joint, and means for shifting said guide.

19. In an internal combustion engine, the combination of a crank-shaft, a cylinder, a piston in said cylinder, a rod connecting the crank on said shaft with said piston and having a flexible joint, a pivotally-supported guide with which said rod engages and operating when shifted to move said piston in said cylinder, and means for rocking said guide on its pivot.

20. In an internal combustion engine, the combination of a crank-shaft, a cylinder, a piston in said cylinder, a rod connecting the crank on said shaft with said piston and having a flexible joint, a pivotally-supported guide with which said rod engages at said joint, and means for rocking said guide.

21. In an internal combustion engine, the combination of a crank-shaft, a cylinder, a piston in said cylinder, a rod connecting the crank on said shaft with said piston and having a flexible joint, a pivotally-supported guide with which said rod engages at said joint, said guide being pivotally supported coincident, or substantially coincident, with said joint when the latter is at its lowest point in the stroke of said piston, and means for rocking said guide on its pivot.

22. In an internal combustion engine, the combination of a crank-shaft having a plurality of cranks, a plurality of cylinders and pistons therein, means connecting said pistons with the cranks on said shaft, and means for operating the one of said pistons which is uppermost when the engine is at rest, without moving said crank-shaft.

23. In an internal combustion engine, the combination of a rotatable crank-shaft, piston and cylinder members, a source of mixed air and oil supply communicating with said cylinder, means positively connecting said piston with the crank on said shaft, and means for moving one of said members longitudinally of the other thereof independently of said crank-shaft.

24. In an internal combustion engine, the combination of a rotatable crank-shaft, piston and cylinder members, a source of mixed air and oil supply communicating with said cylinder, means operatively connecting said piston with the crank on said shaft, and means for moving said piston longitudinally of said cylinder independently of said crank-shaft.

25. In an internal combustion engine, the combination of a crank-shaft having a plurality of cranks, a plurality of cylinders adapted to be connected with a fuel supply, pistons in said cylinders and connected with said cranks, and pivoted guide members operatively engaged by the reciprocating pistons, said guide members being pivoted at such points that when the pistons are on their firing strokes, the connection of said pistons with said guide members will be eccentric of the pivots of the latter, whereby rocking of said guide members causes the one of said pistons which is on firing stroke to be reciprocated to introduce a charge of fuel into the cylinder containing said piston.

26. In an internal combustion engine, the combination of a crank-shaft having a plurality of cranks, a plurality of cylinders adapted to be connected with a fuel supply, pistons therein, jointed connectors connecting said pistons with the cranks on said shaft, and pivotally supported guide members with which said connectors slidingly engage, the axes upon which said pivoted members are movable being substantially in alinement with the adjacent connectors when the pistons connected therewith are at the end of their firing strokes and being eccentric when on firing stroke, whereby the one of said pistons which is on firing stroke when the engine is at rest is caused to be reciprocated to introduce a charge of fuel into the cylinder containing said piston when said guide members are rocked on their pivots.

EMIL M. KRAMER.

In presence of—
 CARL A. MARTINSON,
 FRANK LINDLEY.